G. R. BRENNEMAN.
SWINGING GATE STOP.
APPLICATION FILED MAY 17, 1912.
1,086,749.
Patented Feb. 10, 1914.
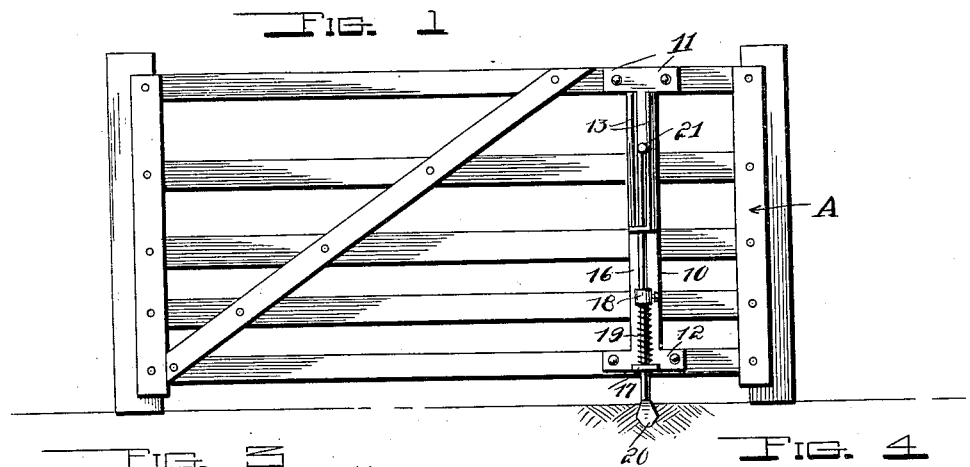
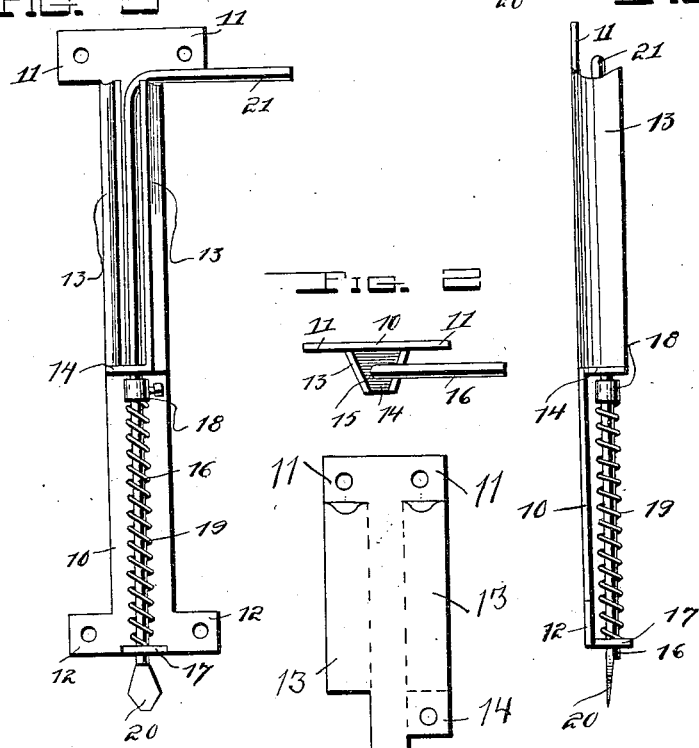
Witnesses
Frank S. Ratcliffe
Harry M. Fest
Inventor
G. R. Brenneman.
By
Attorneys

UNITED STATES PATENT OFFICE.

GEORGE R. BRENNEMAN, OF WHEELING, MISSOURI.

SWINGING-GATE STOP.

1,086,749.  Specification of Letters Patent.  Patented Feb. 10, 1914.

Application filed May 17, 1912. Serial No. 697,997.

*To all whom it may concern:*

Be it known that I, GEORGE R. BRENNEMAN, a citizen of the United States, residing at Wheeling, in the county of Livingston, State of Missouri, have invented certain new and useful Improvements in Swinging-Gate Stops; and I do hereby declare the following to be a full, clear, and exact description of the invention, such as will enable others skilled in the art to which it appertains to make and use the same.

This invention relates to improvements in gates, and has particular reference to a device for holding a gate open at various positions.

The principal object of the invention is to provide a simple device of this character which may be readily attached to any gate now in use, and which will positively hold the gate open at various positions. These and other objects will be apparent from the following description and with particular reference to the accompanying drawings.

In the drawings: Figure 1 is a view of a gate showing my device applied thereto and in operative position, Fig. 2 is a top plan view, Fig. 3 is an enlarged front elevation of the device detached from the gate, and Fig. 4 is a side elevation, Fig. 5 is a plan view of the blank which forms the base.

Referring particularly to the drawings, my device comprises a base 10 having formed integrally at the upper end thereof the laterally extending perforated ears 11, and at the lower end a similar pair of perforated ears 12, said ears being adapted for attachment of the base to the latch end of the gate A, as shown. Between the ears 11 and 12, and extending forwardly from the base are the elongated parallel wings 13, the lower end of one of said wings being bent horizontally, as at 14, so that its free end engages the bottom of the other wing. Formed centrally in this portion 14 is an opening 15, in which is vertically slidable the ground engaging rod 16, the lower end of which is flattened and sharpened to pierce the ground. On the bottom of the base, and between the ears 12 is an outstanding perforated guide lug 17, through which the lower end portion of the rod 16 is guided. Adjustably mounted on the rod at a suitable point between the lug 17 and the member 14 is a stop collar 18, and arranged between this collar and the lug 17, and secured respectively thereto at its opposite ends is a coil spring 19, encircling the rod, and having a tendency normally to draw the rod downwardly so that its point 20 will engage in the ground beneath the gate, to hold the gate in open position. The upper end of the rod 16 is provided with an offset handle portion 21, which when the device is in inoperative position rests on the upper edge of one or the other of the wings 13, against the tension of the spring 19, and when the said offset portion is thrown forwardly to the center the spring will draw the rod 16 downwardly, so that its point will engage in the ground, the offset portion 21 moving downwardly between the wings 13. When in this position the rod is prevented rotating by the engagement of the offset portion 21 with one or the other of the wings 13.

This device is adapted for use with a gate which has a latch, or this device may be used in lieu of the latch, the same securely holding the gate either in fully closed position, or open at any angle.

While I have shown and described the device as used on a gate, it will be understood that the same may be easily applied to a door.

What is claimed is:

A gate stop comprising a base plate secured to the latch end of the gate and formed from a blank, said base plate comprising a pair of vertically disposed outstanding parallel wings formed on the upper portion of the base plate, an apertured offset formed on the lower end of one of the wings and bent to extend horizontally under the lower end of the other wing, an apertured guide lug extending from the lower end of the base in vertical line with the said offset, a ground engaging rod slidable vertically through the apertured offset and the said lug and between the wings, an offset handle portion on the upper end of the rod, an adjustable collar on the rod, and a spring secured to the base and to the collar for drawing the rod into ground engaging position when the offset is between the wings, said wings preventing the turning of the rod when the rod is in ground engaging position, the upper end faces of the wings being formed with curved depressions for the reception of the handle portion to hold the rod in elevated position.

In testimony whereof, I affix my signature, in presence of two witnesses.

GEORGE R. BRENNEMAN.

Witnesses:
A. E. NAY,
E. BRAUER.

Copies of this patent may be obtained for five cents each, by addressing the "Commissioner of Patents, Washington, D. C."